US011058248B2

(12) United States Patent
Smaldone et al.

(10) Patent No.: US 11,058,248 B2
(45) Date of Patent: Jul. 13, 2021

(54) BEVERAGE BREWING APPARATUS AND CONTAINER INCLUDING A FRAGILE INNER CONTAINER

(71) Applicant: Alfay Designs

(72) Inventors: Al Smaldone, Brooklyn, NY (US); Timothy J. Kennedy, Greenwich, CT (US)

(73) Assignee: Alfay Designs, Rahway, NJ (US)

( * ) Notice: Subject to any disclaimer, the term of this patent is extended or adjusted under 35 U.S.C. 154(b) by 0 days.

(21) Appl. No.: 15/061,902

(22) Filed: Mar. 4, 2016

(65) Prior Publication Data

US 2016/0255986 A1  Sep. 8, 2016

Related U.S. Application Data

(60) Provisional application No. 62/128,201, filed on Mar. 4, 2015.

(51) Int. Cl.
*A47J 31/20* (2006.01)

(52) U.S. Cl.
CPC ..................... *A47J 31/20* (2013.01)

(58) Field of Classification Search
CPC ........ A47J 31/20; A47J 31/18; A47J 31/0626; A47J 31/0636; A47G 19/16
USPC .................... 99/299, 318, 319, 320
See application file for complete search history.

(56) References Cited

U.S. PATENT DOCUMENTS

| | | | | |
|---|---|---|---|---|
| 941,769 A * | 11/1909 | Durand | ................... | A47J 41/02 215/12.1 |
| 3,307,256 A * | 3/1967 | Powers | ...................... | B67B 7/38 30/410 |
| 3,662,674 A * | 5/1972 | Clausse | .................. | A47J 27/211 219/495 |
| 2008/0060526 A1* | 3/2008 | Gilbert | .................... | A47J 31/20 99/289 D |
| 2008/0274246 A1* | 11/2008 | Glucksman | ............. | A47J 31/20 426/425 |
| 2013/0239821 A1* | 9/2013 | Boettcher | ............... | A47J 31/20 99/317 |
| 2015/0173413 A1* | 6/2015 | Wells | ...................... | A23P 1/084 426/302 |
| 2016/0157662 A1 | 6/2016 | Yang | | |

FOREIGN PATENT DOCUMENTS

| | | | | |
|---|---|---|---|---|
| CN | 202104664 | | 1/2012 | |
| CN | 202636446 | | 1/2013 | |
| JP | 3199670 | | 9/2015 | |
| TW | I624237 B | * | 5/2018 | ............ A47J 31/18 |

OTHER PUBLICATIONS

Machine translation of TW I624237 B (Year: 2018).*

* cited by examiner

*Primary Examiner* — Erin E McGrath
(74) *Attorney, Agent, or Firm* — Fay Kaplun & Marcin, LLP

(57) ABSTRACT

A beverage brewing apparatus having a liquid container with a fragile inner wall, a rugged outer wall and a cushioning structure placed between the fragile inner wall and the rugged outer wall, a lid that seals the liquid container, the lid including a magnet portion that faces an interior of the liquid container when the lid seals the liquid container and an infuser that moves freely within the liquid container and releasably attaches to the magnet portion of the lid.

13 Claims, 7 Drawing Sheets

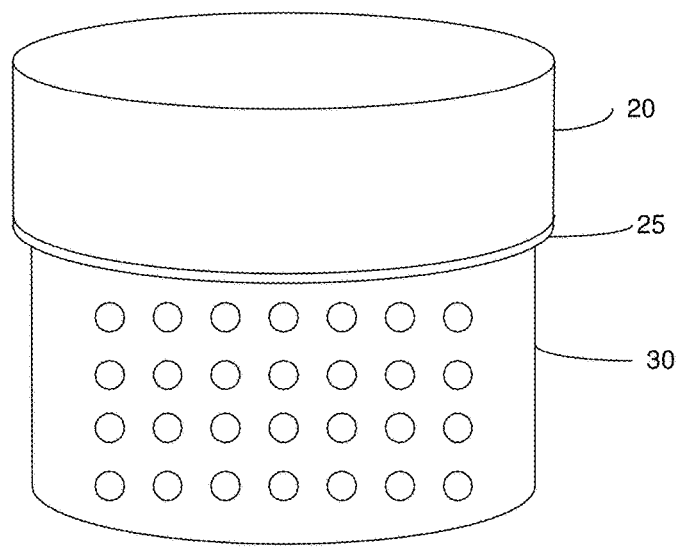
Fig. 2
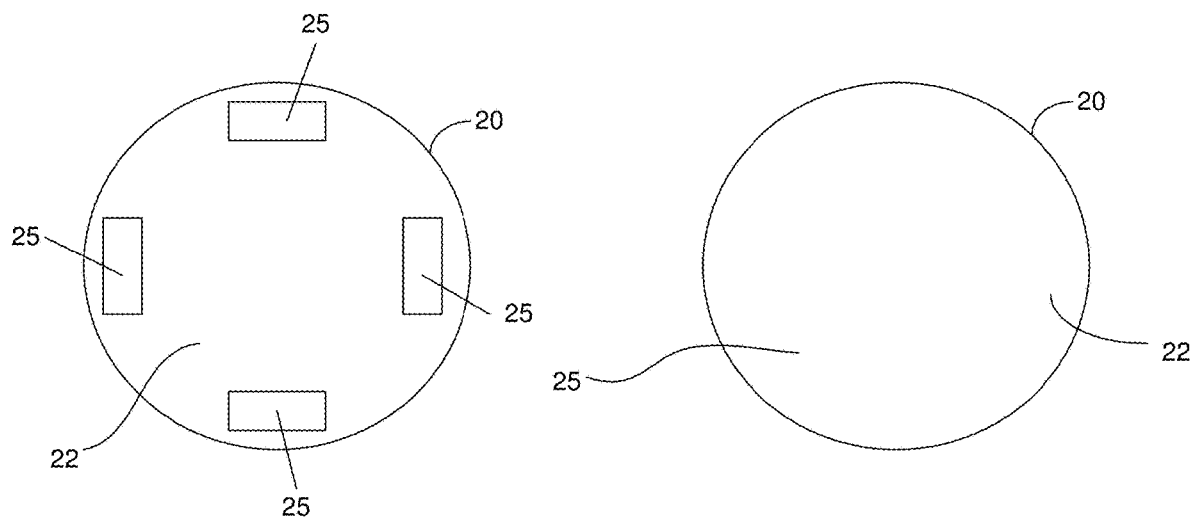
Fig. 3
Fig. 4

US 11,058,248 B2

BEVERAGE BREWING APPARATUS AND CONTAINER INCLUDING A FRAGILE INNER CONTAINER

PRIORITY CLAIM/INCORPORATION BY REFERENCE

This application claims priority to U.S. Provisional Application 62/128,201 entitled "Tea Brewing Apparatus and Container Including a Fragile Inner Container," filed on Mar. 4, 2015, the entirety of which is incorporated herein by reference.

BACKGROUND

Many people drink tea or other beverages that need to be brewed. Different people like their brewed beverages to be brewed to a different level of brewing, e.g., some people like very dark tea (tea that has been brewed a relatively long time), some people like very light tea (tea that has been brewed a relatively short time), and there are many gradations between these two extremes. People also do not have time to wait around for their tea to brew to their desired level of brewing, so people may leave their home or the business at which the tea started brewing with a tea bag in the container. However, those who drink tea will understand that if the tea bag is left in the water for an extended period of time, the tannins and other undesirable characteristics of the tea may seep into the water making the tea unpleasant to drink.

SUMMARY

An apparatus having a liquid container, a lid that seals the liquid container, the lid including a magnet portion that faces an interior of the liquid container when the lid seals the liquid container and an infuser that is configured to float freely within the liquid container and releasably attach to the magnet portion of the lid.

A liquid container having a fragile inner wall, a rugged outer wall and a cushioning structure placed between the fragile inner wall and the rugged outer wall.

A beverage brewing apparatus having a liquid container, comprising a fragile inner wall, a rugged outer wall and a cushioning structure placed between the fragile inner wall and the rugged outer wall, a lid that seals the liquid container, the lid including a magnet portion that faces an interior of the liquid container when the lid seals the liquid container and an infuser that is configured to float freely within the liquid container and releasably attach to the magnet portion of the lid.

DESCRIPTION OF THE DRAWINGS

FIG. 2 shows an example of when an infuser has been captured by a magnet portion of a lid of the exemplary beverage brewing apparatus.

FIG. 3 shows a first exemplary arrangement of magnets that comprise a magnet portion of the bottom surface of a lid of the beverage brewing apparatus.

FIG. 4 shows a second exemplary arrangement of the magnet portion of the bottom surface of a lid of the beverage brewing apparatus.

DETAILED DESCRIPTION

Figure 1:
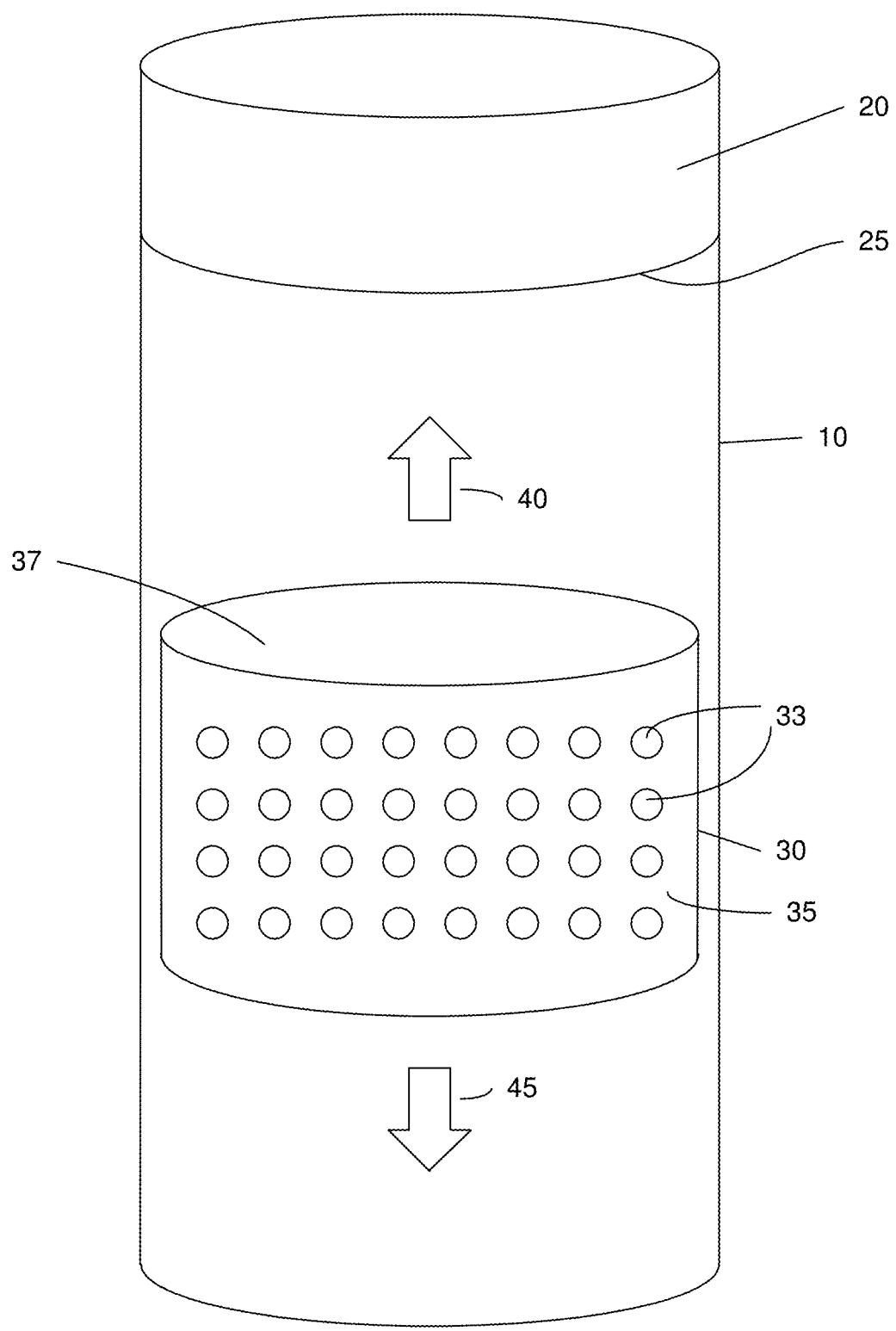
FIG. 1 shows an exemplary embodiment of a beverage brewing apparatus for brewing and drinking tea or any other beverage that may be brewed in accordance with the embodiments.

The exemplary embodiments may be further understood with reference to the following description and the appended drawings, wherein like elements are referred to with the same reference numerals. The exemplary embodiments describe a container that includes a beverage brewing apparatus that allows a user to brew their beverage (e.g., tea, herbal tea, etc.) for the user's desired brewing time without the user having to remove any contents of the container, (e.g., a tea bag) while the user is traveling or otherwise using the container. The exemplary embodiments also describe a double walled container that includes an unbreakable outer wall (e.g., plastic, stainless steel, etc.) and a generally fragile inner wall (e.g., glass, ceramic, etc.), wherein a cushioning material is placed between the outer and inner walls such that when the container falls, the inner fragile wall does not break. It should be understood that that container that includes the beverage brewing apparatus may also be the double walled container having the outer and inner walls. However, the beverage brewing apparatus and the double walled container may be used independently of each other.

It should also be noted that throughout the description, the beverage brewing apparatus will be described as brewing tea. However, it should be understood that the exemplary apparatus may be used to brew any type of beverage, e.g., herbal tea, vegetable or fruit infused water, etc. In the case of vegetable (e.g., cucumber) or fruit (e.g., lemon) infused water, the brewing process may be a cold brewing process as opposed to a hot brewing process. That is, instead of adding hot water to the beverage brewing apparatus, cold water and/or ice may be added.

FIG. 1 shows an exemplary embodiment of a beverage brewing apparatus 1 for brewing and drinking tea or any other beverage that may be brewed in accordance with the embodiments described below. The beverage brewing apparatus 1 includes a liquid container 10, a lid 20 and an infuser 30. Each of these components will be described in greater detail below.

The liquid container 10 may be any container that is capable of holding a liquid. For example, the liquid container may be a glass container, a ceramic container, a stainless steel container, a plastic container, etc. The liquid container 10 may be sized for personal use (e.g., holds 12-24 ounces of liquid) or for larger brewing tasks (e.g., holds 24 ounces-1 gallon of liquid). These sizes are only exemplary and the liquid container 10 may be any size. In the exemplary embodiments, it will be considered that the liquid being held by the liquid container 10 is water that is used to brew tea, but the liquid container 10 may hold any liquid. In this exemplary embodiment, the liquid container 10 is cylindrically shaped, but the liquid container may take on any shape. As will be described in greater detail below, the liquid container 10 may be the exemplary double walled container, but it is not required that the liquid container 10 double walled. In the example of FIG. 1, the liquid container 10 is a standard single walled container.

The lid 20 is used to seal the liquid container 10 such that the liquid does not leak or spill from the liquid container 10. The lid 20 may be constructed from the same or a different material as the liquid container 10. For example, if the liquid container 10 is plastic, the lid 20 may be made of the same plastic. If the liquid container 10 is glass, the lid may be plastic, stainless steel, etc. The lid 20 may be securely attached to the liquid container via any known means. For example, the liquid container 10 may include threads allowing the lid 20 to be screwed onto the liquid container 10. In another example, the lid 20 may have a press fit mechanism such as a flexible O-ring that allows the lid 20 to be press fit into the liquid container 10 to create the seal. There are many other known mechanisms for attaching a lid to a container and any one of these mechanisms may be used. While not shown in FIG. 1, the lid 20 may also include other features such as a mechanism to allow a person to drink or pour the liquid from the tea brewing apparatus 1. Examples of these other features will be illustrated and described in greater detail below.

The lid 20 further includes a magnet portion 25 that is arranged such that the magnet portion 25 faces the interior of the liquid container 10 when the lid 20 is attached to the liquid container 10. The magnet portion 25 may be formed of any magnetic material. For example, the magnet portion 25 may be formed of any ferromagnetic or ferrimagnetic material such as iron, nickel, cobalt, etc. The magnet portion 25 may include any type of arrangement. It should be noted throughout this description, the term "magnet" will be used to describe a material that is actually magnetized and the term "magnetic material" is used to describe a material that is a magnet or is attracted to a magnet.

FIG. 3 shows a first exemplary arrangement of magnets that comprise a magnet portion 25 of the bottom surface 22 of the lid 20 of the beverage brewing apparatus 1. In the example of FIG. 3, the magnet portion 25 comprises a plurality of fixed magnets that are attached to the bottom surface 22 of the lid 20. FIG. 4 shows a second exemplary arrangement of the magnet portion 25 of the bottom surface 22 of the lid 20 of the beverage brewing apparatus 1. In the example shown in FIG. 4, the magnet portion 25 is formed as the entirety of the bottom surface 22 of the lid 20. Those skilled in the art will understand that there may be many other arrangements of the magnet portion 25 that may be used to accomplish the functionality described below for the magnet portion 25. Any of these other arrangements may be used. A further example of the magnet arrangement will be described below.

Referring back to FIG. 1, the infuser 30 is shown as having a cylindrical shape and fits into the liquid container 10. In this example, the radial diameter of the infuser 30 is slightly less than the radial diameter of the liquid container 10. This allows the infuser 30 to move up and down in the direction of the arrows 40 and 45, respectively, within the liquid container 10. While the infuser 30 may have any diameter, it is preferred that the diameter be just slightly smaller than the diameter of the liquid cylinder 10 because this will allow the infuser 30 to move without twisting within the liquid container 10 and also will prevent the infuser 30 from constantly rattling against a side of the liquid container 10 as the infuser 30 moves within the liquid container 10.

The infuser 30 may be constructed of any material (e.g., stainless steel, plastic, etc.), with the exception that a top surface 37 of the infuser 30 will include a material that is magnetic or attracted to a magnet for reasons described in further detail below. Thus, the top surface 37 may be magnetic itself or a magnet may be attached to the top surface 37 that is constructed from a non-magnetic material. In addition, the infuser 30 may be formed in any shape. As described above, the exemplary infuser 30 is cylindrical, but if the shape of the liquid container 10 is altered, the shape of the infuser 30 may be correspondingly altered or may also stay the same. The only limitation on the shape of the infuser 30 being that it will fit into the liquid container 10 and it will be free to move within the liquid container 10. Thus, in another example, infuser 30 could be spherically shaped and have a diameter that is slightly less than the liquid container 10.

The infuser 30 generally includes a hollow body into which the beverage brewing material (e.g., tea leaves, herbs, spices, fruits, vegetables, etc.) may be placed. The sidewall 35 of the infuser 30 includes holes 33 that allow the water from the liquid container 10 to enter the hollow body of the infuser 30 and brew the water into tea. The holes 33 should be sized such that the brewing material are maintained within the hollow body of the infuser 30 and do not leak out into the liquid container 10. In an alternative embodiment, there may be fine mesh screens within the hollow body that does not allow the brewing material to escape, but allows the water to reach the brewing material. In such an embodiment, the size of the holes 33 is not critical. It should also be noted that the number and arrangement of the holes 33 is not critical. Other arrangements and numbers of holes may be used. In addition, there could be additional holes on the top surface 37 or the bottom surface of the infuser 30.

Since it is contemplated that the brewing material (e.g., tea leaves) will be single use, or at most several uses, the infuser 30 will have a mechanism to add and remove tea leaves to/from the infuser 30. For example, a top surface 37 of the infuser 30 may be releasably attached to the body of the infuser 30 (e.g., screwed on, a hinge joint, etc.) such that a user has access to the hollow body to add/remove brewing material. Those skilled in the art will understand that other mechanisms may be used to add/remove the brewing material, for example, it may be the bottom of the infuser 30 that is releasably attached.

The top surface 37 of the infuser 30 may be a magnetic material or any material that is attracted to a magnet. For example, the top surface 37 may be constructed of stainless steel or the top surface 37 may have an arrangement with fixed magnets similar to that shown in FIG. 3 for the magnet portion 25 of the lid 20. As the infuser 30 moves within the liquid container 10, the infuser 30 may approach the magnet portion 25 of the lid 20. When the top surface 37 is within a distance that the magnet portion 25 exerts a magnetic attraction to the top surface 37 of the infuser 30, the infuser 30 will be captured by the magnet portion 25 and stay fixed to the lid 20. FIG. 2 shows an example of when the infuser 30 has been captured by the magnet portion 25 of the lid 23.

The following provides an example use of the beverage brewing apparatus 1. The complete beverage brewing apparatus 1 may be disassembled, e.g., the infuser 30 is outside the liquid container 10 and the lid 20 is not attached to the liquid container 10. A user may insert the brewing material (e.g., tea leaves) into the infuser 30 and then insert the infuser 30 into the liquid container 10. At this point there is no liquid within the liquid container 10, so the infuser 30 will rest at or near the bottom of the liquid container 10. The user may then add hot water to the liquid container 10. The liquid container 10 may include a marking or other indication that shows the user how much water to add (e.g., a "fill to" line). The addition of the liquid will cause the infuser 30 to begin to float within the liquid container 10. It should be understood that the process may also be reversed, the hot water is added to the liquid container 10 and then the infuser 30 (holding the brewing material) is inserted into the liquid container 10. The user may then attach the lid 20. Again, as noted above, while the exemplary embodiment is being described as a hot brewing process, the exemplary embodiments may also be used for cold brewing (e.g., infusing herbs, fruits or vegetables into cold water).

As the beverage is brewing within the liquid container 10, the infuser 30 is free to float up and down in the direction of arrows 40 and 45. In fact, the user may invert the beverage brewing apparatus 1 to cause the infuser 30 to float up and down, but such inversion is not required. When the user is satisfied that the tea is brewed to their liking, the beverage brewing apparatus 1 may be tilted slightly or inverted to allow the infuser 30 to rise near the top of the liquid container 10 to approach the magnet portion 25 of the lid 20. As described above, when the infuser 30 approaches the magnet portion 25, the magnetic attraction between the top surface 37 of the infuser 30 and the magnet portion 25 of the lid 20 will causes the infuser 30 to attach to the lid 20 and stay affixed such as shown in FIG. 2. When this occurs, the brewing process is stopped because the hot water is no longer in contact with the brewing material in the infuser 30. That is, the fill line is such that when infuser 30 is magnetically attached to the lid 20, the water is below the bottom of the infuser 30. The user may then drink the beverage or allow it to sit without further brewing occurring. As described above, the lid 20 may have a mechanism to allow the user to drink the beverage through the lid 20 or pour the beverage out of the lid 20.

It should be noted that the lid 20 may include a further mechanism to allow the user to release the infuser 30 from the magnet portion 25 without opening the beverage brewing apparatus 1 (e.g., with the lid 20 remaining connected to the liquid container 10). The mechanism may be, for example, a mechanical device actuated by an exterior button on the lid 20 that separates the infuser 30 from the magnet portion 25 such that the magnetic attraction is overcome to allow the infuser 30 to float in the liquid container 10. This may be used, for example, when the user decides that additional brewing time is needed or the infuser 30 is accidentally attached to the lid 20.

In the example provided above, the tea infuser 30 and the tea brewing apparatus 1 was used to brew tea. However, those skilled in the art will understand that the tea brewing apparatus 1 may be used to brew any type of drink. For example, coffee grains could be placed in the tea infuser 30 to brew coffee. Fruit, such as a lemon, could be placed in the tea infuser 30 to brew hot or cold water with a lemon flavor. Herb tea may be brewed by placing herbs into the tea infuser 30. Based on these additional examples, it should be seen that any type of beverage may be brewed in the tea brewing apparatus 1.

Figure 5:
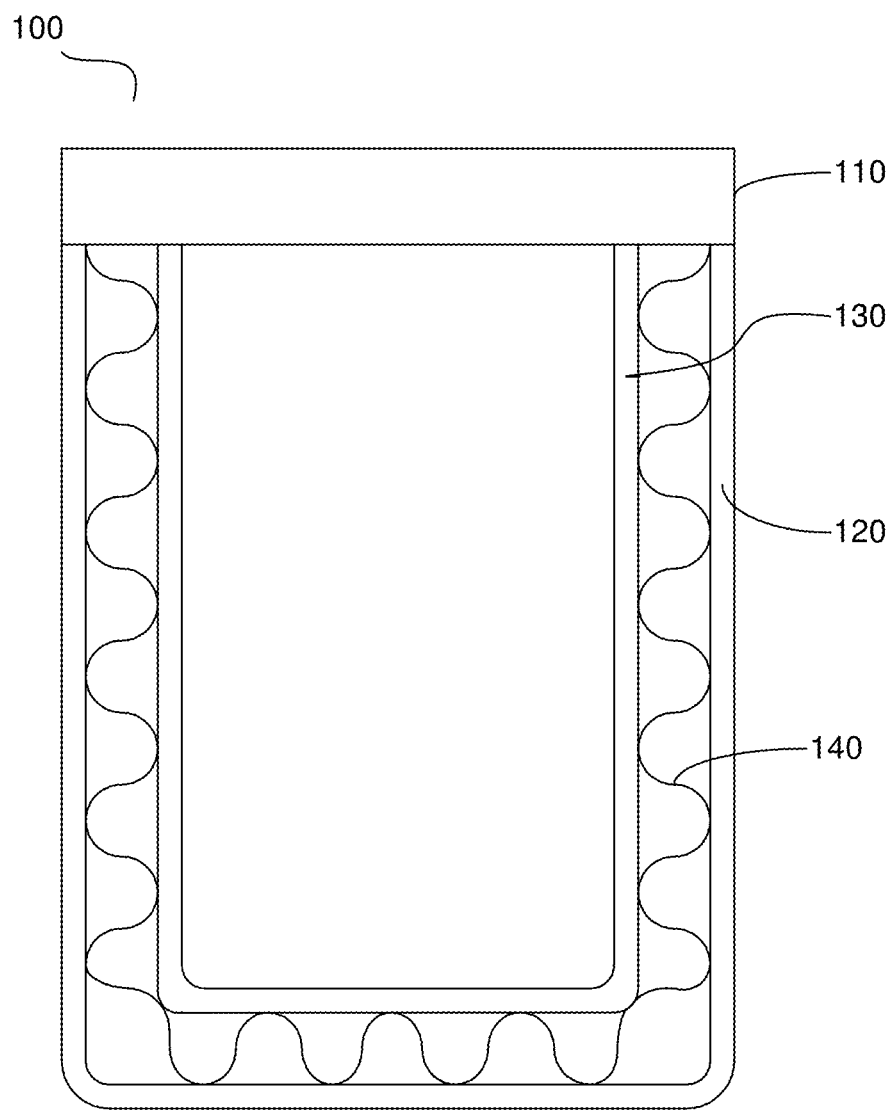
FIG. 5 shows an exemplary embodiment of a double walled container having a fragile inner wall and rugged outer wall.

FIG. 5 shows an exemplary embodiment of a double walled container 100 having a fragile inner wall 130. The double walled container 100, in addition to the fragile inner wall 130, includes a rugged outer wall 120, a cushioning structure 140 and a lid 110. The double walled container 100 may be the beverage brewing apparatus 1 described above, or may be any type of container. In this example, the infuser of the beverage brewing apparatus is not shown.

The fragile inner wall 130 may be constructed of any material such as glass, ceramic, etc., that is liable to break if the double walled container 100 is dropped. The rugged outer wall 120 is constructed of a material that is unbreakable from drops of a reasonable height (e.g., 10 feet or less). This material may be plastic, stainless steel, etc. It should be noted that the term "plastic" may refer to any type of synthetic or semi-synthetic materials commonly referred to as plastics. Some examples include polyethylene, high-density polyethylene, polystyrene, etc. However, if the double walled container 100 only included the fragile inner wall 130 and the rugged outer wall 120, a drop may still cause damage to the fragile inner wall 130 because it receives the shock from the fall. Thus, the double walled container 100 further includes the cushioning structure 140 that is placed between the fragile inner wall 130 and the rugged outer wall 120. The cushioning structure 140 cushions the fragile inner wall 130 from the shock of the fall, thereby preventing the fragile inner wall 130 from breaking during a fall.

The cushioning structure 140 may be any type of material that will cushion the fragile inner wall 130. For example, the cushioning structure 140 may be constructed from silicone, rubber, flexible thermoplastic, etc. In the embodiment shown in FIG. 5, the cushioning structure 140 is inserted between an outer surface of the fragile inner wall 130 and an inner surface of the rugged outer wall 120 as a continuous sheet that alternately contacts the fragile inner wall 130 and the rugged outer wall 120 in a corrugated pattern. However, there are any number of embodiments of the cushioning material.

Figure 6:
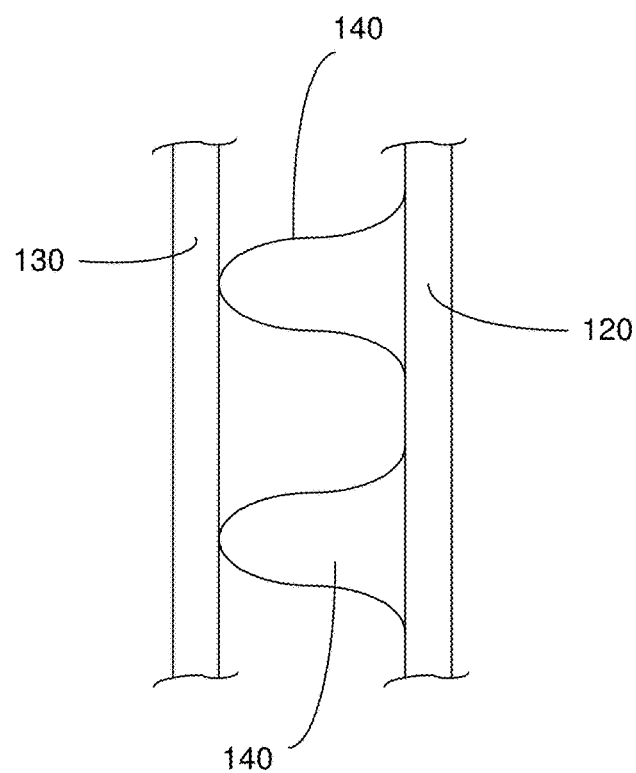
FIG. 6 shows a side view of a cross-section of a second exemplary embodiment of a double walled container and the fragile inner wall, the rugged outer wall and the cushioning structure.

For example, FIG. 6 shows a side view of a cross-section of another exemplary embodiment of the double walled container 100 having the fragile inner wall 130 and the rugged outer wall 120, where the cushioning structure 140 is a series of nubs or fingers that are attached to the inner surface of the rugged outer wall 120 and extend to the outer surface of the fragile inner wall 130. It should be noted that the nubs or fingers could also be attached to the outer surface of the fragile inner wall 130 and extend outward to the inner surface of the rugged outer wall 120.

Figure 7:
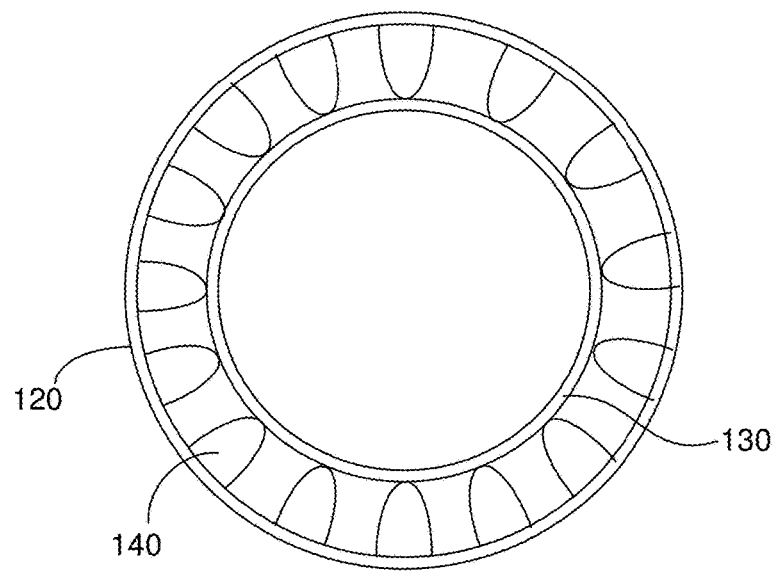
FIG. 7 shows a top view of a cross-section of the same exemplary embodiment as shown in FIG. 6.

FIG. 7 shows a top view a cross-section of the same embodiment of the double walled container 100 as shown in FIG. 6. As shown in this view, the nubs or fingers that extend from the cushioning structure 140 extend around the entire circumference of the fragile inner wall 130 and the rugged outer wall 120. In the example of FIG. 6, two rows of nubs are shown, but there may be more rows. The multiple rows may be separated by various distances. In another embodiment, the fingers or nubs may be placed randomly between the fragile inner wall 130 and the rugged outer wall 120. From the above examples, it should be seen that the cushioning structure may take on a variety of forms.

Figure 8:
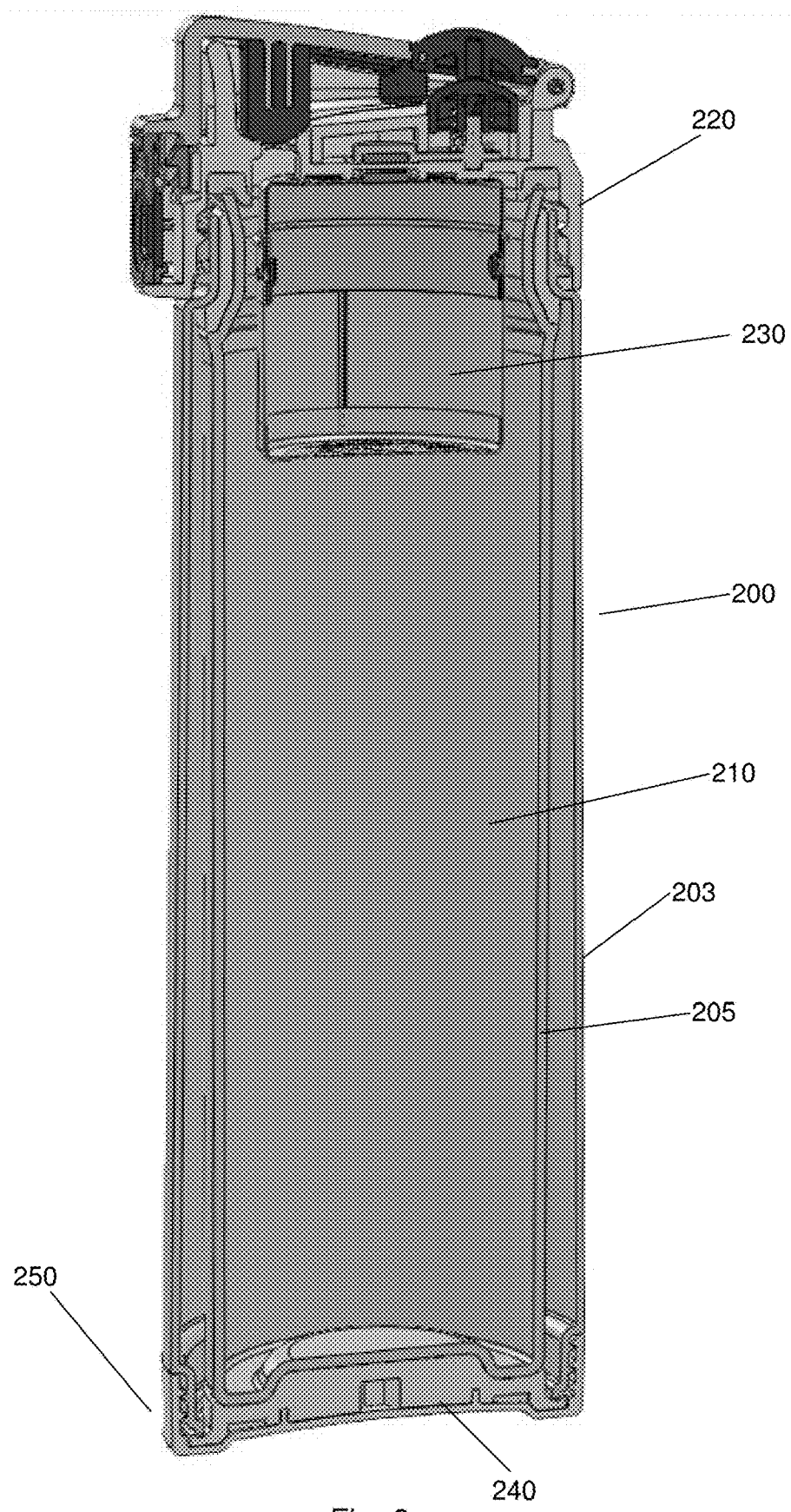
FIG. 8 shows an exemplary embodiment of a beverage brewing apparatus that includes a double walled container.

FIG. 8 shows an exemplary embodiment of a beverage brewing apparatus 200 that includes a double walled container. The beverage brewing apparatus 200 includes a liquid container 210, a lid 220, and an infuser 230. However, in this exemplary embodiment, the liquid container 210 is the exemplary double walled container. That is, the liquid container 210 includes a fragile inner wall 205 (e.g., glass) and a rugged outer wall 203 (e.g., plastic). In this example, the container defined by the fragile inner wall 205 holds the brewing liquid (e.g., hot or cold water).

In addition, in this example, the cushioning structure 240 is only placed between the inner fragile wall 205 and the outer rugged wall 203 in the bottom area 250 of the beverage brewing apparatus 200. This arrangement of the cushioning structure 240 in the bottom area 250 of the beverage brewing apparatus will be described in greater detail below.

Figure 9:
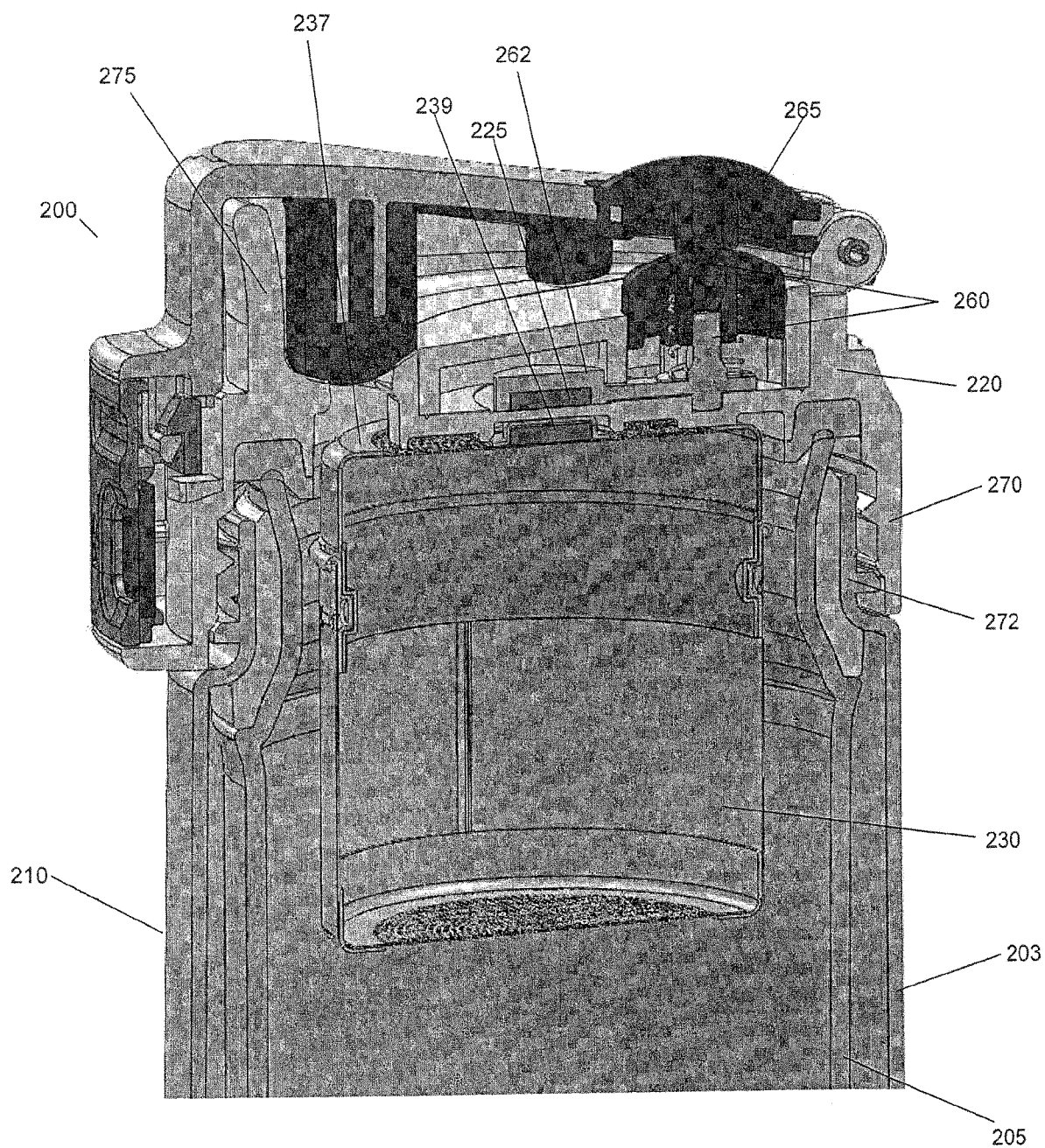
FIG. 9 shows a more detailed view of the upper portion of the exemplary beverage brewing apparatus of FIG. 8.

FIG. 9 shows a more detailed view of the upper portion of the beverage brewing apparatus 200. As shown in this view, the lid 220 includes a release mechanism 260 to allow the user to release the infuser 230 from the magnet portion 225 without opening the beverage brewing apparatus 200 (e.g., with the lid 220 remaining connected to the liquid container 210). In this example, the top wall 237 of the infuser 230 includes a magnet 239. The lid 220 includes a magnet 225. As described above, as the infuser 230 approaches the lid 220, the attractive force between the magnet 239 of the infuser 230 and the magnet 225 of the lid 223 will cause the infuser 230 to releasably connect or couple to the lid 220, thereby stopping the brewing process because the water in the liquid container 210 is below the infuser 230. However, in this example, an arm 262 of the release mechanism 260 is interposed between the magnets 239 and 225 when the infuser 230 is releasably connected or coupled to the lid 220. That is, the magnetic force between the two magnets 239 and 225 is enough to connect or couple the infuser 230 to the lid 220 even though the arm 262 is interposed between the magnets 239 and 225.

The release mechanism 260 also includes a button 265 on the top of the lid 220 that is accessible to a user. The user may depress the button 265 that causes the arm 262 to move towards the magnet 239 of the infuser 230. This movement causes there to be a greater separation between the magnets 239 and 225. This movement is enough to overcome the magnetic force between the two magnets 239 and 225, thereby causing the infuser 230 to decouple from lid 221. The infuser 230 may then float freely within the liquid container 210 as described above. The button 265 may then move back to its original position to allow the infuser 230 to reattach to the lid when the user desires. The release mechanism 260 including the button 265 and arm 262 may be constructed from any material including the same material as the lid 220. It should be noted that in the arrangement shown in FIG. 9, it would be preferable if the arm 262 was constructed of non-magnetic material because the magnet 239 of the infuser 230 may attach to the arm 262 if it was constructed of magnetic material.

It should also be noted that the release mechanism 260 described above is only one possible example of a release mechanism. Depending on the manner in which the infuser 230 is releasably attached to the lid 220, those skilled in the art will understand that other types of release mechanisms may also be used. In one possible alternative embodiment, the magnet 225 of the lid may move upward causing the separation between the magnets 225 and 239. In another possible exemplary embodiment, the button may cause a series of fingers to move downward to press the infuser 230 away from the lid 220. From these examples, it should be seen that there may be many type of release mechanisms.

In addition, FIG. 9 also shows the lid 220 includes threaded portion 270 that couples to a threaded portion 272 of the double walled liquid container 210. FIG. 9 also shows that the lid 220 includes a spout 275 for drinking or pouring the liquid cut of the beverage brewing apparatus 200. The spout 275 may be perpetually open or may be closed and opened as desired by the user, e.g., a flip spout that opens and closes. It should also be noted that the infuser 230 of FIG. 9 is not shown with any holes, but this is only for convenience as the infuser 230 will have some mechanism for water to flow to the brewing material when submerged in the liquid of the liquid container 210.

Figure 10:
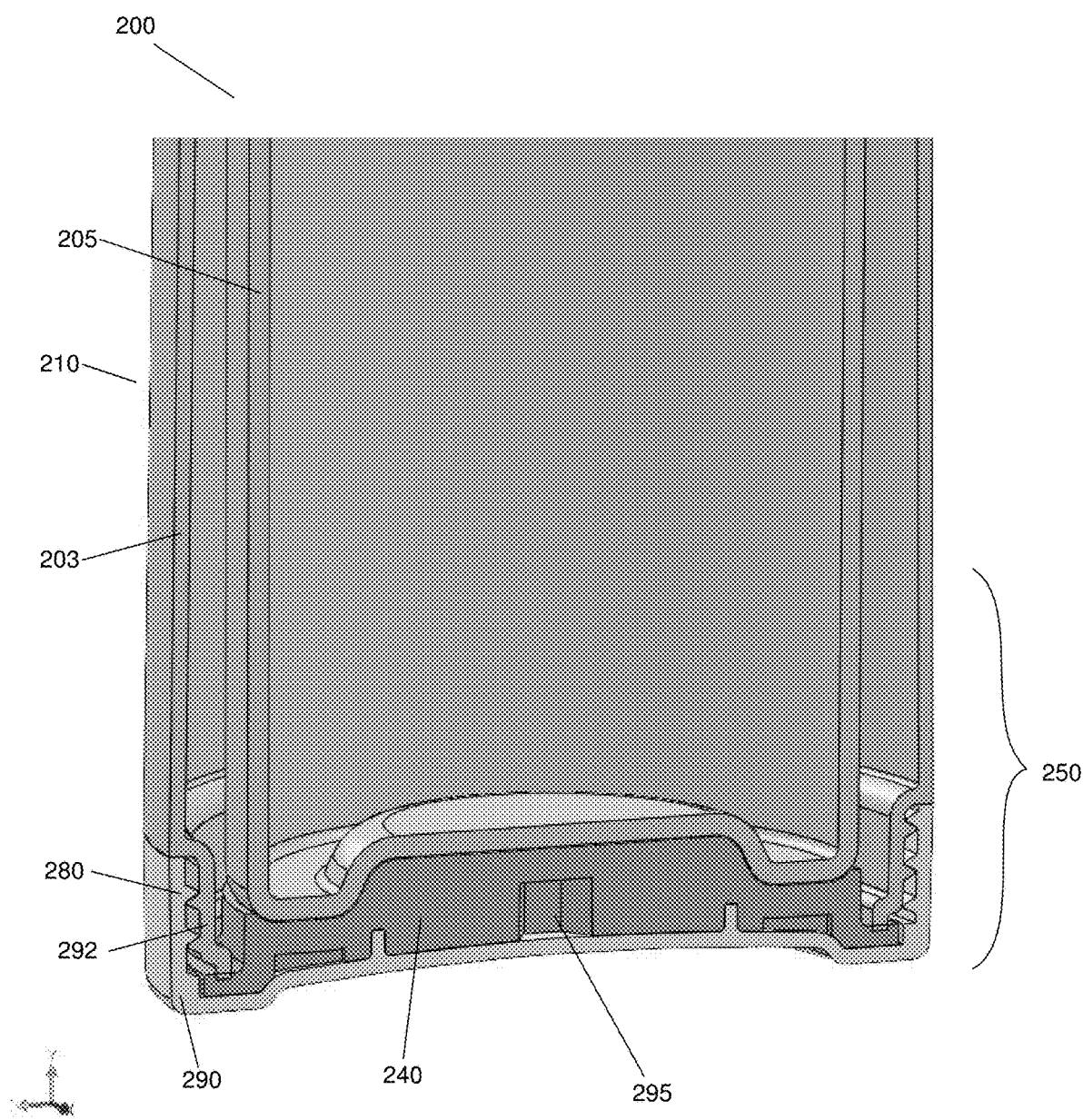
FIG. 10 shows a more detailed view of the lower portion of the exemplary beverage brewing apparatus of FIG. 8.

FIG. 10 shows a more detailed view of the lower portion of the exemplary beverage brewing apparatus 200 of FIG. 8 including the bottom area 250. The beverage brewing apparatus 200 includes the liquid container 210 having the inner fragile wall 205 and the outer rugged wall 203. The fragile inner wall 205 has a closed bottom to hold the liquid. However, the outer rugged wall 203 of the liquid container 210 has an open bottom. In the area of the sidewall near the open bottom, the rugged outer wall 203 includes threads 280.

The beverage brewing apparatus 200 also includes a bottom cap 290. As shown in FIG. 10, the bottom cap 290 has threads 292 that correspond to the threads 280 of the rugged outer wall 203 such that the bottom cap 290 may be releasably coupled to the rugged outer wall 290. This releasable coupling may be used to take the beverage brewing apparatus apart for cleaning or other purposes.

FIG. 10 also shows that the bottom cap 290 includes the cushioning structure 240. The bottom cap should be constructed of a material that is also rugged. It does not need to be the same material as the rugged outer wall 203, but it may be the same material. Thus, when the bottom cap 290 is coupled to the rugged outer wall 203, the cushioning structure 240 cushions the fragile inner wall 205 as described above. The coupling of the bottom cap 290 to the rugged outer wall 203 causes a tight fit between the cushioning structure 240 and the fragile inner wall 205. Thus, the coupling of the lid 220 to the top of the liquid container 210 and the coupling of the bottom cap 290 to the bottom of the liquid container 210 causes the fragile inner wall 205 to be pressed tightly against both the lid 220 and the cushioning structure 240 of the bottom cap 290. This causes there to be very little relative movement between the fragile inner wall 205 and the rugged outer wall 203. Thus, if the beverage brewing apparatus 200 were to fall, the fragile inner wall 205 is protected.

As can be seen in FIG. 10, in this exemplary embodiment, the cushioning structure 240 is a wheel-like structure that surrounds the bottom of the fragile inner wall 205 to provide the cushion. In this embodiment, no other cushioning structure is used, e.g., the side cushioning structure shown in FIG. 5 is not used. The cushioning structure 240 may be coupled to the bottom cap 290 in any manner, e.g., glued, molded, press fit, etc. The cushioning structure 240 may be constructed of any material that provides adequate cushioning between the bottom cap 290 and the fragile inner wall 205, including the exemplary materials described above for the cushioning structure 140. In the example of FIG. 10, the cushioning structure 240 includes cut-out areas 295. These cut-out areas 295 are not required, but they may add to the cushioning effect by allowing the cushioning structure 240 to deform and absorb the shock when such a shock occurs. Those skilled in the art will understand that there may be many design variations for the cushioning structure 290 including the whether there are cut-out areas and the placement of the cut-out areas.

It should be noted that in the above examples, it was described that the lid 20 or 220 included a magnet and the infuser 30 or 230 included a magnet or a magnetic material that is attracted to the magnet of the lid. It should be noted that it is also possible to arrange the lid and infuser such that the infuser includes a magnet and the lid includes only the magnetic material that is attracted to the magnet of the infuser.

It will be apparent to these skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. An apparatus, comprising:
    a liquid container;
    a lid that seals the liquid container, the lid including a magnet portion that faces an interior of the liquid container when the lid seals the liquid container and a spout configured to allow liquid from the liquid container to be poured or drunk out of the liquid container;
    an infuser that is configured to hold brewing material and move freely within the liquid container and includes a magnetic material to releasably attach the infuser to the magnet portion of the lid; and
    a button and an arm interposed between the lid and the infuser configured to release the infuser from the lid by separating the magnet portion of the lid from the magnetic material of the infuser, by depressing the button, causing a portion of the arm to move towards the magnetic material of the infuser, wherein the infuser is configured to be released from the magnet portion of the lid when the liquid container is sealed by the lid, wherein, when released from the lid, the infuser is free to move within the liquid container without any connection to the liquid container or the lid during a brewing operation, and wherein the apparatus is configured to perform a brewing operation based on the infuser being released from the magnet portion of the lid when the liquid container is sealed by the lid and a subsequent drinking or pouring operation without unsealing the liquid container.

2. The apparatus of claim 1, wherein the magnetic material of the infuser is located in a top surface of the infuser.

3. The apparatus of claim 1, wherein the liquid container includes:
    a fragile inner wall;
    a rugged outer wall; and
    a cushioning structure constructed from a material that provides a cushion when placed between two surfaces.

4. The apparatus of claim 3, wherein the fragile inner wall is one of glass or ceramic.

5. The apparatus of claim 3, wherein the rugged outer wall is one of plastic or stainless steel.

6. The liquid container of claim 3, wherein the cushioning structure is placed between an outer surface of the fragile inner wall and an inner surface of the rugged outer wall.

7. The liquid container of claim 3, further comprising:
    a bottom cap, wherein the rugged outer wall includes an open bottom and the bottom cap is coupled to the rugged outer wall to seal the open bottom.

8. The liquid container of claim 7, wherein the cushioning structure is coupled to the bottom cap and the cushioning structure is tightly coupled with the fragile inner wall to permit negligible relative movement between the fragile inner wall and rugged outer wall when the bottom cap is coupled to the rugged outer wall.

9. The liquid container of claim 8, wherein the cushioning structure is only placed in the bottom cap.

10. A beverage brewing apparatus, comprising:
    a liquid container having a first end and a second end and comprising a fragile inner wall, a rugged outer wall and a cushioning structure constructed from a material that provides a cushion when placed between two surfaces;
    a lid that seals the liquid container at the second end, the lid including a magnet portion that faces an interior of the liquid container when the lid seals the liquid container;
    an infuser that is configured to move freely within the liquid container and includes a magnetic material to releasably attach the infuser to the magnet portion of the lid; and
    a button and an arm interposed between the lid and the infuser configured to release the infuser from the lid by separating the magnet portion of the lid from the magnetic material of the infuser, by depressing the button, causing a portion of the arm to move towards the magnetic material of the infuser, wherein the infuser is configured to be released from the magnet portion of the lid to permit the infuser to float freely without any connection to the lid or the liquid container when the liquid container is sealed by the lid during a brewing operation, and wherein in a first orientation where the second end is above the first end the infuser is configured to move from the second end to the first end when released from the magnet portion of the lid.

11. The beverage brewing apparatus of claim 10, further comprising:
    a bottom cap, wherein the rugged outer wall at the first end includes an open bottom and the bottom cap is coupled to the rugged outer wall to seal the open bottom at the first end.

12. The beverage brewing apparatus of claim 11, wherein the cushioning structure is coupled to the bottom cap and the cushioning structure is tightly coupled with the fragile inner wall to permit negligible relative movement between the fragile inner wall and rugged outer surface when the bottom cap is coupled to the rugged outer surface and wherein the cushioning structure is only placed in the bottom cap.

13. The beverage brewing apparatus of claim 10, wherein the cushioning structure is constructed in a corrugated pattern to create pockets of empty space between the fragile inner wall and the rugged outer wall at least in the area of the first end of the liquid container.

* * * * *